(12) United States Patent
Bell et al.

(10) Patent No.: US 10,937,332 B2
(45) Date of Patent: Mar. 2, 2021

(54) SYSTEMS AND METHODS FOR PROVIDING A VIRTUAL HEADS UP DISPLAY IN A VEHICLE SIMULATOR

(71) Applicant: The Boeing Company, Chicago, IL (US)

(72) Inventors: Charles F Bell, Tacoma, WA (US); David M Racek, Seattle, WA (US); Nicholas R Frederick, Seattle, WA (US); Stephen M Raabe, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 482 days.

(21) Appl. No.: 14/918,173

(22) Filed: Oct. 20, 2015

(65) Prior Publication Data
US 2017/0110023 A1    Apr. 20, 2017

(51) Int. Cl.
*G09B 9/32* (2006.01)
*G02B 27/01* (2006.01)
*G09B 9/16* (2006.01)
*G09B 9/08* (2006.01)

(52) U.S. Cl.
CPC ........... *G09B 9/32* (2013.01); *G02B 27/0101* (2013.01); *G09B 9/08* (2013.01); *G09B 9/165* (2013.01); *G09B 9/326* (2013.01); *G02B 2027/014* (2013.01); *G02B 2027/0129* (2013.01); *G02B 2027/0187* (2013.01)

(58) Field of Classification Search
CPC .............................. G09B 9/32; G09B 27/0101
USPC .......................................................... 434/44
See application file for complete search history.

(56) References Cited

U.S. PATENT DOCUMENTS 2,286,474 A * 6/1942 Durham .................... F41G 3/00
                                                                    33/276
4,439,755 A * 3/1984 LaRussa ................. F41G 3/225
                                                                    340/980
(Continued)

FOREIGN PATENT DOCUMENTS

CA          2587017 A1    5/2006
JP       2003058039 A     2/2003
(Continued)

OTHER PUBLICATIONS

Mar. 10, 2017 Extended European Search Report issued in European Patent Application No. 16194663.7.
(Continued)

*Primary Examiner* — Xuan M Thai
*Assistant Examiner* — Sadaruz Zaman
(74) *Attorney, Agent, or Firm* — Moore Intellectual Property Law, PLLC (57) ABSTRACT

Systems and methods for providing a virtual heads up display in a vehicle simulator include a vehicle simulator. The vehicle simulator includes a visual projector including visual system optics, a virtual heads up display (VHUD) projector mounted within the visual system optics of the visual projector and a projection screen configured to project images generated by the visual projector and the VHUD projector. The vehicle simulator also includes a VHUD eye reference frame mounted within the vehicle simulator, the VHUD eye reference frame configured to allow viewing therethrough of the projected images.

20 Claims, 7 Drawing Sheets

(56) References Cited

U.S. PATENT DOCUMENTS

| | | | | |
|---|---|---|---|---|
| 4,900,133 A * | 2/1990 | Berman | G02B 5/3016 | 349/11 |
| 5,684,634 A * | 11/1997 | Rogers | G02B 27/0101 | 359/630 |
| 6,152,739 A * | 11/2000 | Amery | G06F 3/1446 | 345/1.3 |
| 6,283,861 B1 * | 9/2001 | Kawai | A63F 13/10 | 463/43 |
| 6,377,277 B1 * | 4/2002 | Yamamoto | A63F 13/10 | 345/629 |
| 6,409,604 B1 * | 6/2002 | Matsuno | A63F 13/10 | 463/43 |
| 6,437,759 B1 * | 8/2002 | Turner | G09B 9/302 | 345/8 |
| 6,612,840 B1 * | 9/2003 | Turner | G02B 27/01 | 434/29 |
| 9,758,256 B1 * | 9/2017 | Shafaat | B64D 43/00 | |
| 2003/0194683 A1 * | 10/2003 | Vorst | G09B 9/30 | 434/38 |
| 2008/0215974 A1 * | 9/2008 | Harrison | A63F 13/10 | 715/706 |
| 2012/0156653 A1 | 6/2012 | Wokurka | | |
| 2012/0309521 A1 * | 12/2012 | Nishiya | A63F 13/533 | 463/31 |
| 2013/0128012 A1 * | 5/2013 | Turner | G06F 3/011 | 348/53 |
| 2013/0209967 A1 | 8/2013 | Guehring | | |
| 2013/0280678 A1 | 10/2013 | Towers et al. | | |

FOREIGN PATENT DOCUMENTS

| | | |
|---|---|---|
| JP | 2008518254 A | 5/2008 |
| KR | 20150007023 A | 1/2015 |

OTHER PUBLICATIONS

Communication Pursuant to Article 94(3) EPC for Application No. 16194663.7 dated Sep. 7, 2018, 8 pgs.

Summons to Attend Oral Proceedings Pursuant to Rule 115(1) EPC mailed Feb. 28, 2019 in corresponding EP Application No. 16194663.7, 7 pages.

Notice of Reasons for Rejection dated Nov. 2, 2020 in corresponding Japanese Application No. 2016-182823, with English translation, pp. 1-6.

* cited by examiner

SYSTEMS AND METHODS FOR PROVIDING A VIRTUAL HEADS UP DISPLAY IN A VEHICLE SIMULATOR

BACKGROUND

The present disclosure relates in general to virtual heads up displays (VHUDs), and more particularly to VHUDs for vehicle simulators, especially flight simulators.

Training exercises may be performed for operating an aircraft. These training exercises are used to teach pilots how to operate the aircraft, including training the pilots on different strategies and tactics with respect to operating the aircraft. For example, pilots may train in an aircraft to improve skills and reactions to different events and conditions.

A large amount of training may be performed using training devices on the ground, such as using flight simulators. A typical flight simulator is a system that copies or simulates the experience of flying an aircraft and is meant to emulate a real flight experience. Flight simulators may range from controls and a display in a room to a full-size replica of a cockpit mounted on actuators that move the cockpit in response to actions taken by a pilot. These simulators provide a capability to teach pilots and/or other crew members to operate various aircraft systems and to react to different events.

Some vehicle simulators, including flight simulators, are equipped with wide angle collimated out-the-window visual systems. In these conventional vehicle simulators, in order to provide heads up display (HUD) operation or capabilities, a real HUD system is installed into the simulator in order to accommodate wide angle collimated visual systems. Integrating real HUDs into vehicle simulators requires HUD projector mounting hardware that is designed specifically for the precise geometric alignment of the HUD bore-sight to the visual system with yaw, roll and pitch rotations to accommodate course visual system optical offsets at the pilot's eye reference points. Additional distortion correction must also be accommodated in the HUD electronics to force the HUD image into conformance with the visual image. This conventional arrangement adds complexity and cost to the overall system, as well as producing disparate parallax errors between the two visual systems.

Thus, in conventional simulator visual systems, such as wide field of view simulator visual systems, when providing a HUD, complex mounting assemblies and real HUD devices are required. Additionally, geometric conformance and correlated parallax errors cannot be provided when integrating real HUDs into simulators.

SUMMARY

In one embodiment, a vehicle simulator is provided that includes a visual projector including visual system optics, a virtual heads up display (VHUD) projector mounted within the visual system optics of the visual projector and a projection screen configured to project images generated by the visual projector and the VHUD projector. The vehicle simulator also includes a VHUD eye reference frame mounted within the vehicle simulator, the VHUD eye reference frame configured to allow viewing therethrough of the projected images.

In another embodiment, a vehicle simulator system is provided that includes a cabin configured to receive therein a person, the cabin including at least one window and a visual system optics configured to project a visual image and a virtual heads up display (VHUD) image generated by a simulator that is viewable by the person through the at least one window of the cabin.

In another embodiment, a method for generating simulation images for a simulator is provided. The method includes mounting a VHUD projector in a visual system optics of a visual projector, mounting one or more VHUD eye reference frames in a simulator and generating images using the VHUD projector and visual projector. The method also includes displaying the images for viewing through the one or more VHUD eye reference frames.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

As used herein, the terms "system," "subsystem", "unit," or "module" may include any combination of hardware and/or software system that operates to perform one or more functions. For example, a system, unit, or module may include a computer processor, controller, or other logic-based device that performs operations based on instructions stored on a tangible and non-transitory computer readable storage medium, such as a computer memory. Alternatively, a system, subsystem, unit, or module may include a hard-wired device that performs operations based on hard-wired logic of the device. The systems, subsystems, modules, or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for providing a virtual HUD in a vehicle simulator, such as a flight simulator. In some embodiments, a virtual HUD can be integrated into vehicle simulators equipped with wide angle collimated out-the-window visual systems with sufficient fidelity to faithfully reproduce the attributes and optical limitations of a real HUD. For example, in various embodiments, a combiner (HUD element closest to the eye) assembly provides parallax and monocular boundary cues to the operator. Additionally, a small high resolution projector driven by a graphics computer projects onto the visual system image forming surface, thereby providing a collimated image to the operator. The image is conformed to the visual system in some embodiments using a software distortion correction application.

Figure 1:
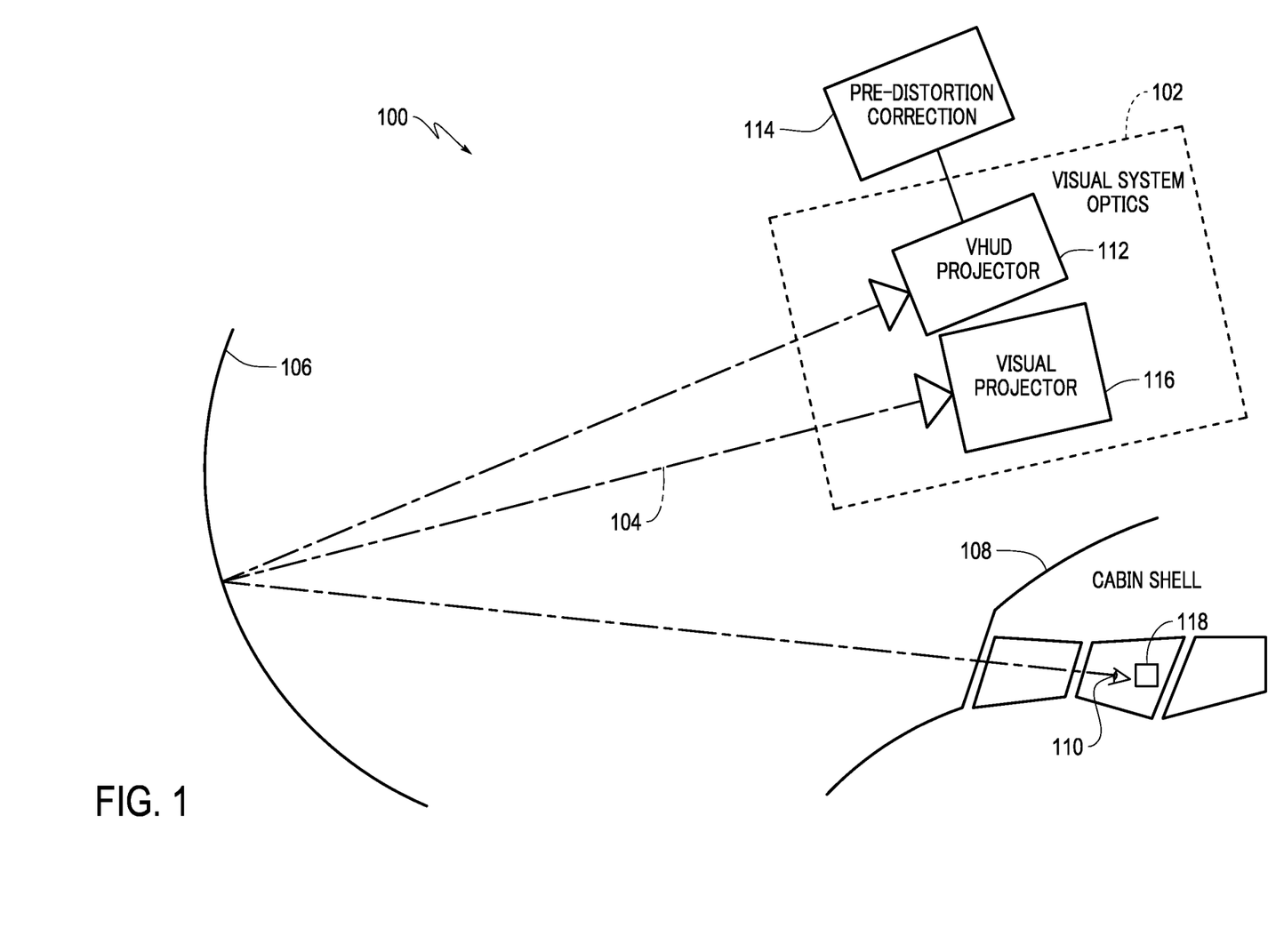
FIG. 1 is a diagram illustrating of a vehicle simulator system in accordance with an embodiment.

As illustrated in FIG. 1, a vehicle simulator system 100 (also referred to as a vehicle simulator 100) may be configured as an aircraft simulator. The vehicle simulator 100 includes visual system optics 102 provided on a projector centerline 104, which projects a simulator image (e.g., an out-the-window scene image) to a projection screen 106. In various embodiments, the projection screen is a back-projection screen. A cabin shell 108 is provided, which was may be an actual portion or replica of an aircraft. As can be seen in FIG. 1, a pilot eye point 110 is directed towards the projection screen 106 where the simulator image is projected by the visual system optics 102. As discussed in more detail herein, images, including VHUD images and visual images may be projected to a spherical rear projection screen and then to a spherical collimating mirror, which an individual in the cabin shell 108 sees.

In the illustrated embodiments, a virtual heads up display (VHUD) projector 112 is mounted inside the visual system optics 102. For example, in some embodiments, the VHUD projector 112 is an LED high resolution consumer projector mounted in combination with the visual system optics 102. Additionally, a pre-distortion correction subsystem 114 is coupled with the VHUD projector 112 to provide distortion correction as described in more detail herein.

In one embodiment, the vehicle simulator 100 includes PC based pre-distortion correction using the predistortion correction subsystem 114 and an LED high resolution consumer projection as the VHUD projector 112, which provide for integration of VHUD projection into a cross-cockpit collimated visual systems. By practicing one or more embodiments, the existing visual system collimation optics (illustrated as the visual system optics 102 in FIG. 1) is used to fuse the VHUD images generated by the VHUD projector 112 and the visual images generated by a visual projector 116, thereby allowing parallax error correlation (e.g., correlation of divergence, convergence or divergence parallax errors). Additionally, pre-distortion in, for example, the PC graphics generator (of the pre-distortion correction subsystem 114) allows for accurate geometric alignment of the VHUD images to a visual system reference test pattern, which conforms a VHUD image to a visual image. Thus, in various embodiments, the VHUD projector 112 is mounted within the visual system optics 102 and aligned to the visual system reference using alignment methods to thereby provide the VHUD image geometric accuracy within the allowable tolerance of a typical airplane installation. As such, in various embodiments, simulated HUD capabilities are integrated into the vehicle simulator 100, more particularly, into a flight simulator collimated visual display system.

In various embodiments, a VHUD eye reference frame 118 is positioned within the cabin shell 108 as described in more detail herein. The VHUD eye reference frame 118 provides near/far parallax and binocular to monocular transition cues that present a realistic HUD combiner simulation to the operation (e.g., a pilot). It should be appreciated that although various embodiments are described in a flight simulator application, one or more embodiments may be implemented in other vehicle simulators as desired or needed. Thus, in various embodiments, a HUD simulator replaces a HUD in a vehicle simulator, which may be provided using a low cost projector instead of an actual HUD system. The HUD simulator replicates a HUD in a simulator.

The vehicle simulator 100 may be used in conjunction with a flight simulation system used, for example, to train aircrew to fly and operate an aircraft. The flight simulation system typically includes a simulation pilot facing the projection screen 106 who may move his head during the simulation system within a viewing volume or line of view. Thus, for example, a pilot is able to view an "out-the-window" scenario simulating the outdoor environment that might be typically seen by the pilot flying an actual aircraft. This computer-generated scenario may include the terrain, landscape, cultural features such as, buildings, vehicles, and other simulated aircraft flying in the vicinity of the pilot's simulated position as part of the visual image generated by the visual projector 116 and HUD visual information generated by the VHUD projector 112.

Within the cabin shell 108, the pilot may also be provided with a conventional or simulated cockpit including an array of cockpit components, such as a throttle, flight stick and associated controls and indicators, a number of head-down cockpit displays displaying various navigation, situational information. However, as should be appreciated, in various embodiments, the cabin shell 108 does not include a real HUD. Instead, the information displayed in a conventional simulator environment by a HUD is generated by the VHUD projector 112. The pilot may be positioned in a predefined viewing volume facing the projector screen 106, which may be viewed through VHUD eye reference frames as discussed in more detail herein.

Figure 2:
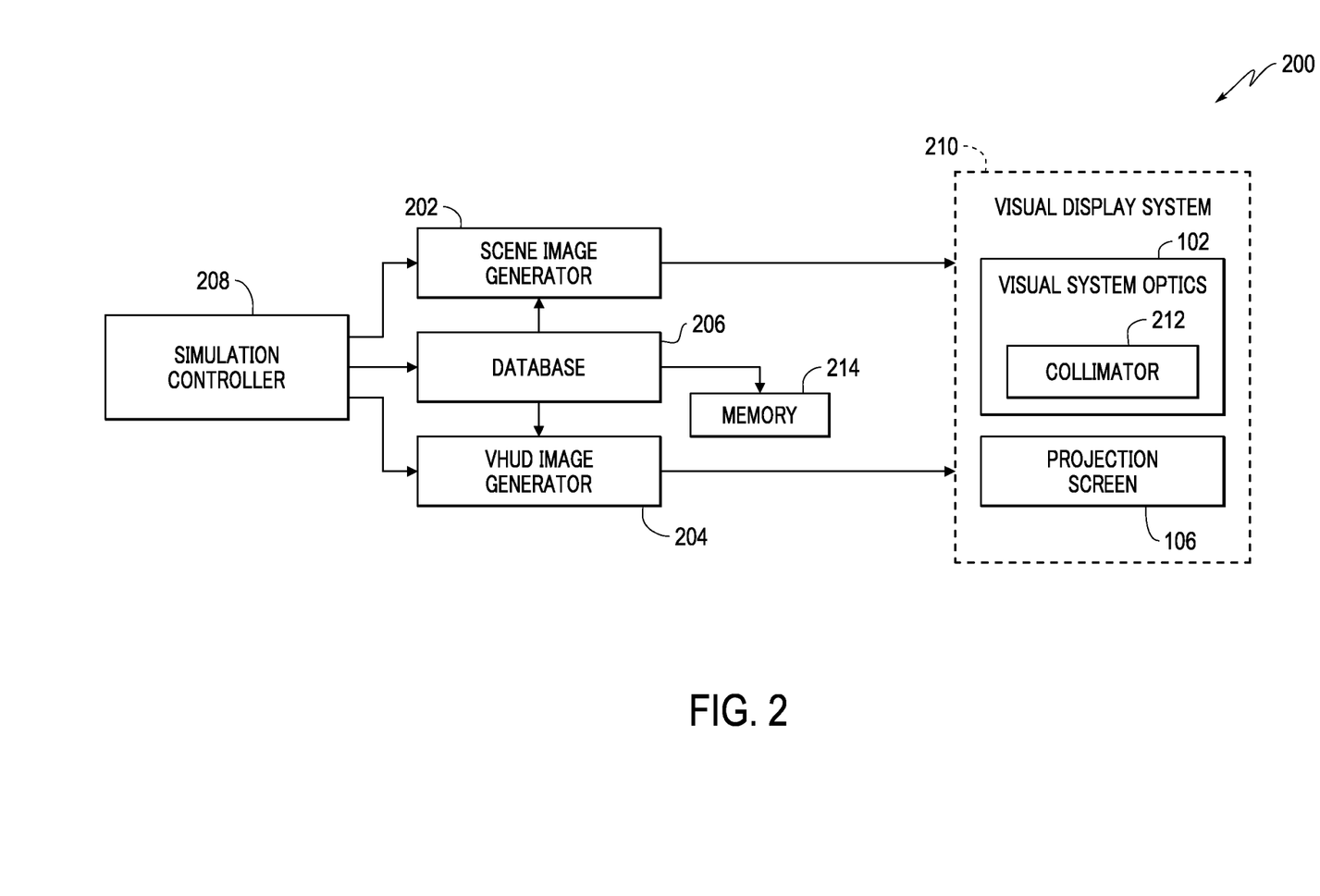
FIG. 2 is a block diagram of an image generation system in accordance with an embodiment.

An image generation system 200 of the vehicle simulator 100 (e.g., a flight simulator 100) will now be described in connection with FIG. 2 (with additional reference to FIG. 1). It should be noted that like numerals represent like components in the various figures. The image generation system 200 includes a scene image generator 202, a VHUD image generator 204, a database 206, a display system controller, illustrated as a simulation controller 208 and a visual display system 210. It should be noted that the visual display system 210 includes the visual system optics 102 (shown in FIG. 1) that has a collimator 212 for collimating scene images and VHUD images for display on the projection screen 106.

The visual display system 210 is coupled to the scene image generator 202 and the VHUD image generator 204 that receive data from the database 206. The data may be processed based on the simulated position of the operator's aircraft, and a video image representative of a portion of the display image can be generated and presented to the pilot from viewing from the cabin shell 108 (shown in FIG. 1). As should be appreciated, the scene image generator 202 and the VHUD image generator 204 generate, respectively, scene images and VHUD images for display on the projection screen 106.

In various embodiments, the database 206 includes a multi-dimensional structural database that may be used by the scene image generator 202 and the VHUD image generator 204 to create images that will be displayed on the projection screen 106. In one embodiment, the contents of the database 206 are downloaded during initiation of a simulation session across a communication link into a memory 214 (which may form part of one or more of the components shown in FIG. 2). In another embodiment, a copy of the data in the database 206 may be provided and maintained in a central computer system (not shown) that may be accessible by the scene image generator 202 and the VHUD image generator 204. In yet another embodiment, the data in the database 206 (or portions thereof) may be updated during the simulation session from the central computer system.

The image generation system 200 includes the simulation controller 208 that provides overall control of the flight simulation. The simulation controller 208, for example, allocates where scene image or VHUD images will be displayed, such as by providing a viewing location defining an address into the database 206 storing the data and information necessary for the scene image generator 202 and the VHUD image generator 204 to generate, and the projection screen 106 to display, the images. Communication between the various components illustrated in FIG. 2 may be provided via a wide band communication link, such as, for example, an Ethernet type communication bus or, in some embodiments, via a wireless communication link.

In one embodiment, the collimator 212 includes a collimating mirror, such as a spherical first surface collimating mirror. The collimator 212 can create a virtual image when a projection screen projects images thereon. The projection screen 106 may be positioned at a factor of an effective focal distance of the collimator 212 such that the virtual image from such an arrangement appears to come from an effectively infinite distance, thereby precisely simulating out-the-window scenes.

The scene image generator 202 and the VHUD image generator 204 may enlarge the video image thereby permitting the operator to view the images with a degree of head motion. In some embodiments, the image source may be made larger than that required for viewing on the optical axis to allow some lateral (right/left or up/down) motion without seeing the edge of the image surface when viewed through or off the collimator 212.

In some embodiments, the collimator 212 is mounted parallel to the surface of the projection screen 106 with the optical axis pointed toward the simulation pilot. Thus, some of the images generated and displayed may be displayed outside of the portion of the active display area viewed by the pilot through the collimator 212 to accommodate continuous imagery as the pilot 12 moves or rotates his or her head. It should be noted that the focal length of the collimator 212 may be optimized for the particular size of the simulator, the size of the projection screen 106, to accommodate the operator's anticipated head movement and/or to provide an apparent virtual image location at or near infinity.

The image displayed on the projection screen 106 may be viewed by the pilot via the collimator 212, which in some embodiments, as described herein, is a spherical first surface collimating mirror. The projection screen 106 in some embodiments is arranged and positioned at a distance from the collimator 212 such that the image displayed, as seen by the pilot via the collimator 212, requires the eyes to slightly converge (or be parallel), allowing the pilot to perceive a far-focused or collimated virtual image. Thus, the image may be perceived to be at distance from the pilot that may be greater than the distance between the pilot and the projection screen 106.

In some embodiments, collimation of the displayed image by the collimator 212 may be produced by a conventional physical mirror (such as a spherical first surface collimating mirror) and beam splitter collimator. In the mirror and beam splitter collimating optics, the projection screen 106 is positioned at half of the radius of curvature of the spherical collimating mirror. In this embodiment, the position of the display is optically folded out of view of the pilot by using a partially reflective, partially transmissive mirror (commonly referred to as a beam splitter). In one embodiment, the projection screen 106 is spherical shaped, which results in a reduced or minimal amount of image distortion as the pilot's position is moved away from the central optical axis. Thus, the pilot within the cabin shell 108 may view an image on the collimating mirror (which may be embodied as the collimator 212) from inside the enclosure of the cabin shell 108.

Figure 3:
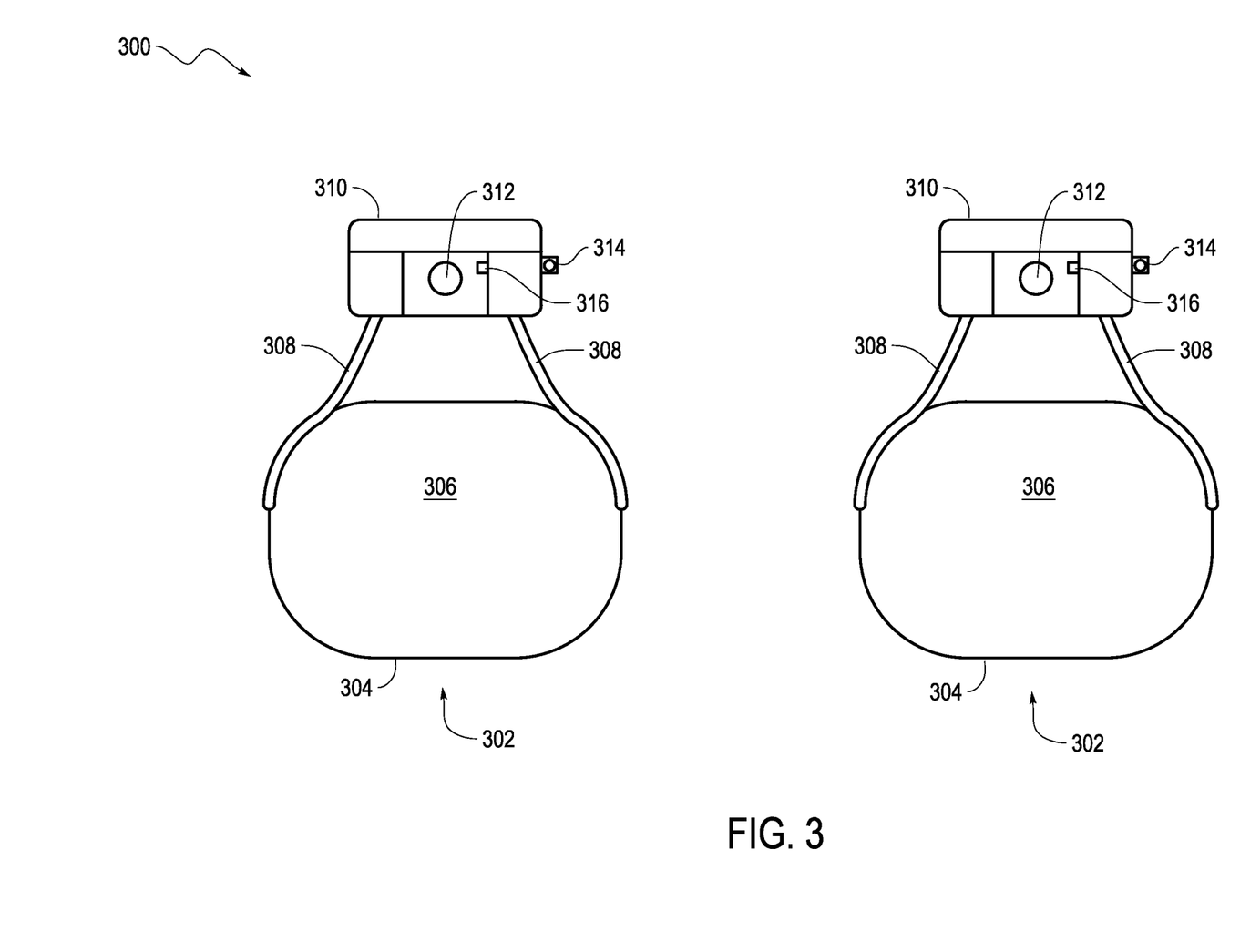
FIG. 3 is an illustration of virtual heads up display eye reference system in accordance with an embodiment.

Referring now to FIG. 3, one embodiment of a VHUD eye reference frame system 300 may be provided in the cabin shell (shown in FIG. 1) and include a pair of VHUD eye reference frames 302 (each or both of which may be embodied as the VHUD eye reference frame 118 shown in FIG. 1). As described herein, the VHUD eye reference frames 302 provide near/far parallax and binocular to monocular transition cues for a pilot viewing the scene image and VHUD image displayed on the projection screen 106 (shown in FIG. 1). In the illustrated embodiment, the VHUD eye reference frames 302 correspond to left seat and right seat VHUD eye reference frames 302 for use by a pilot in the left and right seats, respectively, of the cabin shell 108. For example, the VHUD eye reference frames 302 may be movably mounted (e.g., pivotally mounted to extending arms) within the cabin shell 108 and aligned at about the eye level of a pilot that would sit in a corresponding left and right seat in the cabin shell 108. For example, in one embodiment, the VHUD eye reference frames 302 are mounted within the cabin shell 108 about forty-two inches apart and forty-six inches from a floor of the cabin shell 108. However, it should be appreciated that the VHUD eye reference frames 302 may be mounted in different positions, such as based on the configuration of the cabin shell 108.

The VHUD eye reference frames 302 are sized and shaped to be positioned in front of a defined eye point of the pilots. For example, in one embodiment, the VHUD eye reference frames 302 are configured to be positioned about eight to nine inches in front of an eye point of the pilots. However, the VHUD eye reference frames 302 may be positioned at different distances from the eye point, for example, based on different display requirements. Additionally, the VHUD eye reference frames 302 may be adjustable and movable to be positioned within a distance range in front of the pilots.

The VHUD eye reference frames 302 include a frame body 304 having an opening 306 therethrough. The frame body 304 may be formed of any suitable material, such as a plastic or metal/alloy material (e.g., wire frame) that allows for movement and stowage of the VHUD eye reference frames 302. Additionally, the size and shape of the frame body 304 may be varied such that the size and shape of the opening 306 (defining an empty space) may be changed as desired or needed. In the illustrated embodiment, the opening 306 is generally rectangular in shape having a long axis length of about ten to twelve inches and a short axis length of about five to six inches.

The frame body 304 in the illustrated embodiment is coupled to support arms 308 that are connected to and extend from a control unit 310. As should be appreciated, the control unit 310 is mounted either directly or indirectly (e.g., via a movable member) to the cabin shell 108, such as to the aircraft frame. The control unit 310 provides controls that allow for adjusting different display settings, such as settings for the images displayed on the projection screen 106. In the illustrated embodiment, a brightness control 312 is provided as a knob on a front surface of the control unit 310 (facing the pilot) to allow for control of the brightness of the displayed images. For example, the brightness control 312 may be a potentiometer or encoder that provides control signals to the image generation system 200 (shown in FIG. 2) to adjust the brightness at which the images are displayed. The brightness control 312 may operate to control a software brightness multiplier in the simulation controller 208 (shown in FIG. 2). The brightness control 312 may communicate directly with or indirectly with the VHUD projector 112 and the visual projector 116 (both shown in FIG. 1).

The VHUD eye reference frames 302 also include a locking pin 314 to allow for motion in a stowed position (e.g., moved upward or sideways out of the view of the pilot). When the VHUD eye reference frames 302 are in the stowed position, a stowed switch 316 is activated. Thus, in the illustrated embodiment, when the VHUD eye reference frames 302 are in the stowed (stored) position, the stowed switch 316 is in a locked position such that a strong detent is required to release the stowed VHUD eye reference frames 302 to a deployed position.

As should be appreciated, the VHUD eye reference frames 302 operate as a combiner and the frame body 304 is just a frame that defines the opening 306, which is a simulation of glass. However, there is nothing within the opening 306. Thus, the VHUD eye reference frames 302 define holographical optical elements, which are the final collimating element for the optics (e.g., the visual system optics 102 shown in FIG. 1). As should be appreciated, the VHUD eye reference frames 302 allow for a system that does not need optical elements within the cabin shell 108.

Figure 4:
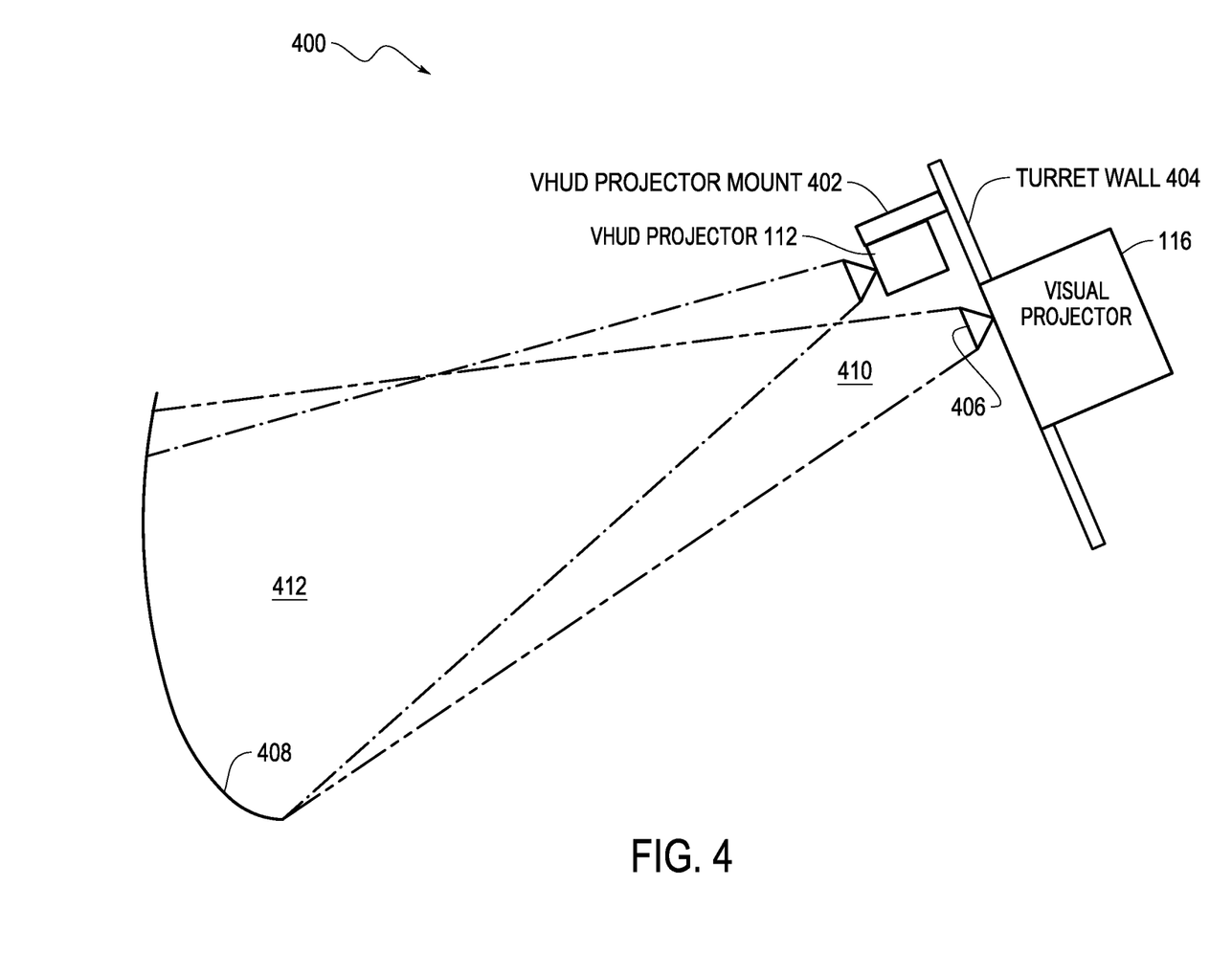
FIG. 4 is a diagram illustrating a projection system in accordance with an embodiment.

The VHUD eye reference frames 302 operate in combination with the image generation system 200 to allow for viewing of realistic simulated images with the vehicle simulator 100. One embodiment of a projection system 400 that allows for displaying scene images and VHUD images is shown in FIG. 4. As can be seen, in this embodiment, the VHUD projector 112 is mounted above and adjacent to the visual projector 116. For example, a projector mount 402 may extend from a turret wall 404 such that when the VHUD projector 112 is mounted to the projector mount 402, the VHUD projector 112 is positioned above a lens 406 of the visual projector 116. It should be noted that the positioning of the VHUD projector 112 relative to the visual projector 116 may be changed, for example, to be positioned below the lens of the visual projector 116. In various embodiments, the VHUD projector 112 is mounted such that the VHUD projector 112 is slightly above a frustum 410 of the visual projector 116.

It should be noted that the projector mount 402 is adjustable. For example, the projector mount 402 is some embodiments provides rotations as follows: pitch -15 degrees (normal) with +/-10 degree adjustment, yaw 0 degrees with +/-5 degree adjustment and roll 0 degrees with +/-5 degree adjustment.

In operation, the visual projector 116 is a main cabin visual projector that generates scene images to define an "out world" view. For example, the visual projector 116 may be any suitable simulator projector, such as a projector having three to five channels that are blended to form a cross-cockpit scene, which in some embodiments, defines a scene image twenty degrees vertically (up/down) and 180 degrees to 220 degrees vertically (left/right).

The VHUD projector 112 may be an LED type projector, for example, an LG PF-1500 projector available from LG Electronics. However, it should be appreciated that different types of projectors, such as different sized and configured LED projectors may be used.

In operation, the visual projector 116 and VHUD projector 112 generate images to be displayed on a back projection screen 408 (e.g., a spherical rear projection screen). In one embodiment, the visual projector 116 has the frustum 410 that displays an image that extends vertically +/-20 degrees with a frustum 412 of the VHUD projector 112 having a lesser range, for example, +12 degrees and -19 degrees. In various embodiments, pre-distortion in, for example, the PC graphics generator (of the pre-distortion correction subsystem 114 shown in FIG. 1) allows for accurate geometric alignment of the VHUD images to a visual system reference test pattern, which conforms the VHUD image to the visual image. For example, the visual projector 116 may display a five-degree cross-hatch pattern reference slide that can be aligned to a test pattern of the VHUD projector 112. Thus, the various test patterns may be aligned to the same reference.

Figures 5, 6:
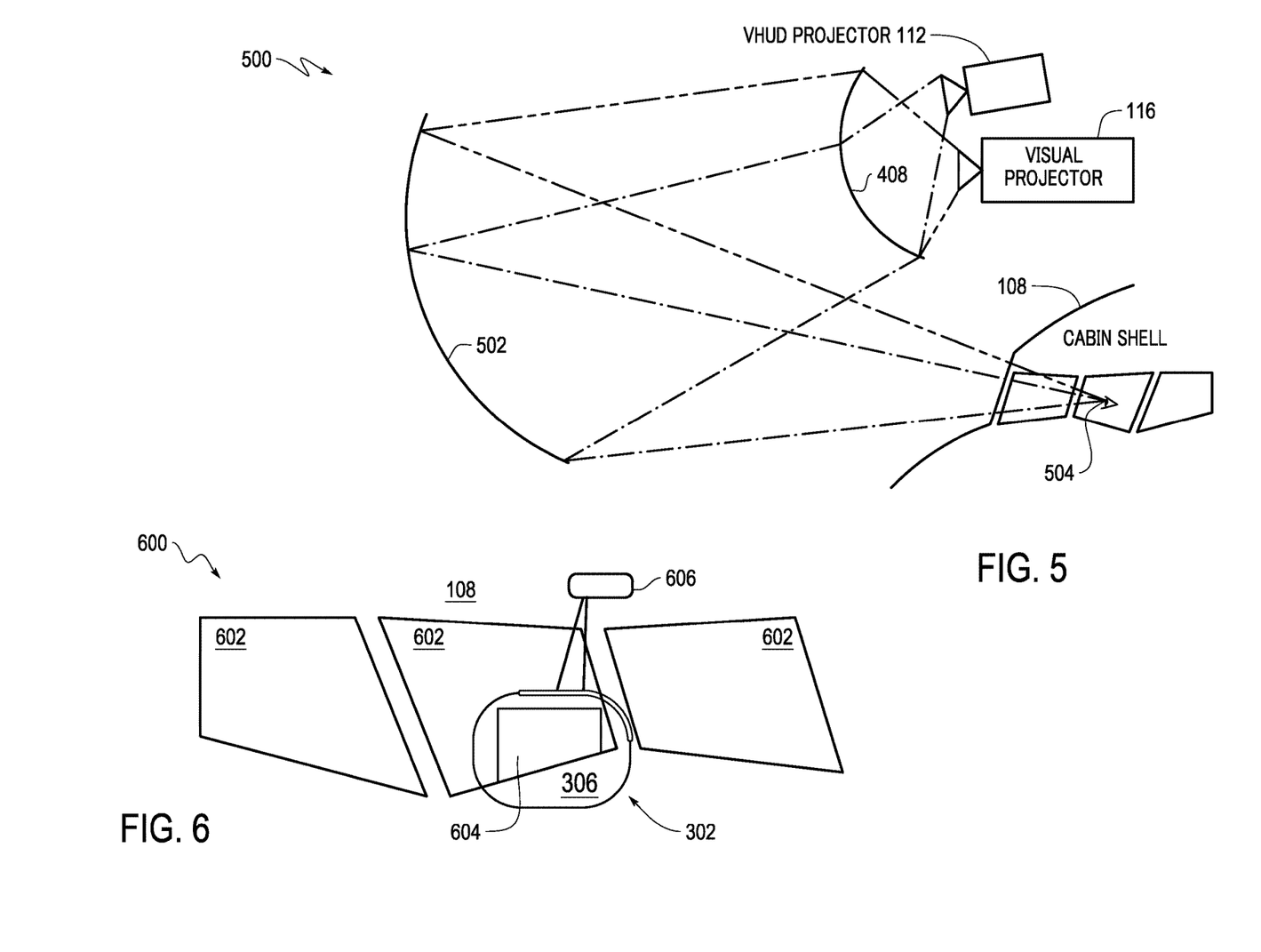
FIG. 5 is a diagram illustrating a flight similar system in accordance with an embodiment.
FIG. 6 is a diagram illustrating a portion of a cabin shell of a simulator in accordance with an embodiment.

Accordingly, a flight simulator system 500 as shown in FIG. 5 may be provided for displaying both visual (scene/out window) images and HUD images without the use of an actual HUD device. As can be seen in FIG. 5, in the illustrated embodiment, the images are projected from the back projection screen 408 to a spherical first surface collimating mirror 502 to provide realistic simulated images from a pilot's eye point 504. For example, as shown in FIG. 6, within the cabin shell 108 is a window structure 600 that includes a plurality of windows (e.g., aircraft cockpit windows 602). Each of the VHUD eye reference frames 302 is positioned in front of the pilot's eye point 504 such that an active HUD area 604 is defined when looking through the opening 306 of one of the VHUD eye reference frames 302. In the illustrated embodiment, the VHUD eye reference frames 302 are mounted to the cabin shell 108 by mounting structures, which are shown as a hinging or pivoting structure 606 that allows for movement of the VHUD eye reference frames 302 relative to the window structure aircraft cockpit windows 602 to allow for proper positioning of the VHUD eye reference frames 302 relative to the pilot's eye point 504.

Thus, various embodiments provide a vehicle simulator system wherein a HUD projector, which in various embodiments is the VHUD projector 112, is mounted within the visual system optics 102 on a projector centerline of the visual projector 116. The positioning of the VHUD projector 112 within the visual system optics 102 provides for geometric conformance of the visual images and the VHUD images and allows for alignment of the VHUD arrangement with the visual system configuration. Additionally, predistortion correction may be provided using a non-linear aligning system, which may be embodied as the pre-distortion correction sub-system 114. Thus, the visual and the VHUD images are collimated and conformal wherein the images are projected down a centerline of the visual projector. It should be noted that left/right correction may be provided as described herein.

The VHUD eye reference frames 302 define the final stage of the collimated optics, such that a conventional combiner is not needed. The VHUD eye reference frames 302 allows for proper focusing by the pilots (or other individuals) viewing the visual and the VHUD images. For example, the VHUD eye reference frames 302 may provide a focus cue past two meters and a divergence cue past thirty feet.

By practicing various embodiments, a collimated out of window (out-the-window) visual system is used to collimate the HUD image and the visual image at the same time. By pre-distorting the images, the images are made conformal. Additionally, the VHUD eye reference frames 302 provide for good cues to maintain the pilot's view in the motion box, such that, for example, a realistic and "real-time" pilot and co-pilot training scenario may be generated.

Figure 7:
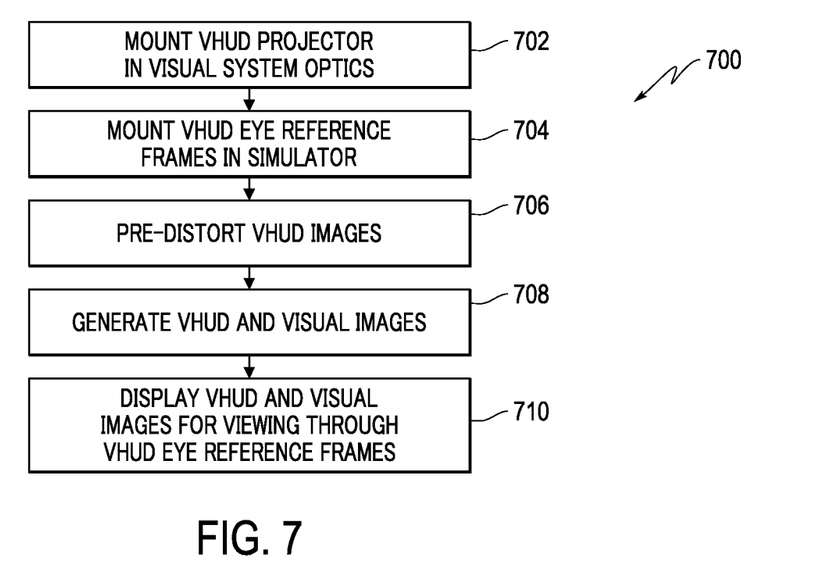
FIG. 7 is a block diagram of a method for generating simulation images for a simulator in accordance with an embodiment.

A method 700 for generating simulation images for a vehicle simulator also may be provided as shown in FIG. 7. The method 700 includes mounting a VHUD projector in the visual system optics at 702. For example, the VHUD projector may be mounted above the frustum of the visual projector as described herein. The method 700 also includes mounting one or more VHUD eye reference frames in a simulator at 704. For example, the VHUD eye reference frames 302 may be mounted within an aircraft cabin shell to be positioned in front of a pilot's eye point.

The method 700 further includes pre-distorting the VHUD images generated by the VHUD projector. For example, the VHUD images are pre-distorted to be conformal with the visual images (e.g., out-the-window images). Then, the VHUD and visual images are generated at 708 and displayed at 710 for viewing through the VHUD eye reference frames 302. That is, the VHUD eye reference frames 302 provide visual cues to maintain the pilot's view in the motion box for viewing the images.

The various embodiments may be implemented in connection with different computing systems. Thus, while a particular computing or operating environment may be described herein, the computing or operating environment is intended to illustrate operations or processes that may be implemented, performed, and/or applied to a variety of different computing or operating environments.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 8:
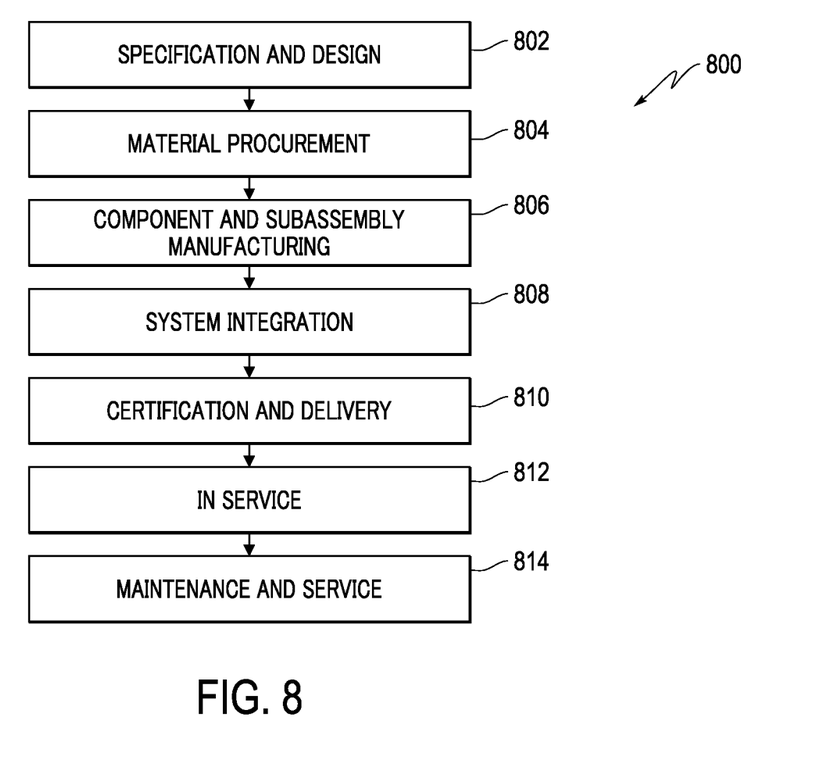
FIG. 8 is a block diagram of aircraft production and service methodology.
Figure 9:
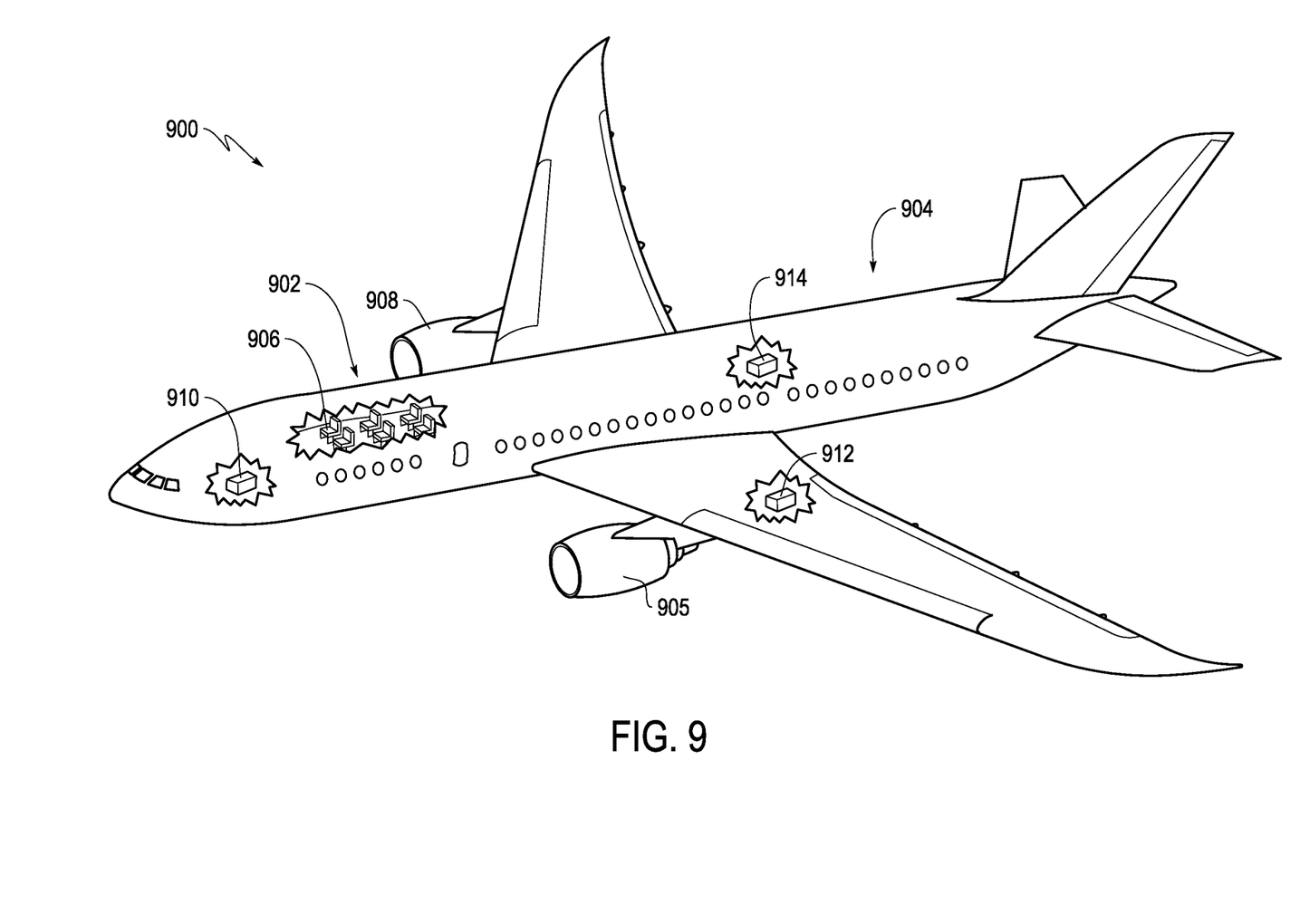
FIG. 9 is a schematic perspective view of an aircraft.

Examples of the disclosure may be described in the context of an aircraft manufacturing and service method 800 as shown in FIG. 8 and an aircraft 900 as shown in FIG. 9. During pre-production, illustrative method 800 may include specification and design 802 of the aircraft 900 and material procurement 804. During production, component and subassembly manufacturing 806 and system integration 808 of the aircraft 900 take place. Thereafter, the aircraft 900 may go through certification and delivery 810 to be placed in service 812. While in service by a customer, the aircraft 900 is scheduled for routine maintenance and service 814 (which may also include modification, reconfiguration, refurbishment, and so on).

Each of the processes of the illustrative method 800 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 9, the aircraft 900 produced by the illustrative method 800 may include an airframe 902 with a plurality of high-level systems 904 and an interior 906. Examples of high-level systems 904 include one or more of a propulsion system 908, an electrical system 910, a hydraulic system 912, and an environmental system 914. Any number of other systems may be included. Although an aerospace example is shown, the principles may be applied to other industries, such as the automotive industry.

Apparatus and methods shown or described herein may be employed during any one or more of the stages of the manufacturing and service method 800. For example, components or subassemblies corresponding to component and subassembly manufacturing 806 may be fabricated or manufactured in a manner similar to components or subassemblies produced while the aircraft 900 is in service. Also, one or more aspects of the apparatus, method, or combination thereof may be utilized during the production states 806 and 808, for example, by substantially expediting assembly of or reducing the cost of an aircraft 900. Similarly, one or more aspects of the apparatus or method realizations, or a combination thereof, may be utilized, for example and without limitation, while the aircraft 900 is in service, e.g., maintenance and service 814.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "subsystem," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A vehicle simulator system comprising:
a visual projector including a visual system optics;
a virtual heads up display (VHUD) projector mounted within the visual system optics of the visual projector;
a projection screen configured to project images generated by the visual projector and the VHUD projector; and
a VHUD eye reference frame mounted at eye level to a cabin shell of the vehicle simulator system, the VHUD eye reference frame comprising a wire frame with an empty space therein to allow viewing of the projected images, wherein the wire frame is attached via a mounting structure to the cabin shell such that the wire frame is movable.

2. The vehicle simulator system of claim 1, wherein the empty space has a rectangular shape.

3. The vehicle simulator system of claim 1, further comprising a VHUD projector mount for mounting the VHUD projector, the VHUD projector mount configured to allow movable adjustment of the mounted VHUD projector, and wherein the VHUD projector is mounted above and adjacent to the visual projector.

4. The vehicle simulator system of claim 1, wherein the VHUD projector is mounted above a frustum of the visual projector.

5. The vehicle simulator system of claim 1, wherein the wire frame is coupled to support arms that extend from a control unit, wherein the control unit is mounted to the cabin shell, and wherein the mounting structure includes the control unit.

6. The vehicle simulator system of claim 1, wherein the visual system optics is used to fuse VHUD images generated by the VHUD projector and visual images generated by the visual projector.

7. The vehicle simulator system of claim 1, further comprising a pre-distortion correction sub-system configured to pre-distort the images generated by the VHUD projector.

8. The vehicle simulator system of claim 1, wherein the empty space has a long axis length greater than or equal to ten inches and less than or equal to twelve inches, and wherein the VHUD projector is an LED projector.

9. The vehicle simulator system of claim 1, wherein the VHUD projector is aligned to generate a VHUD image projected at least partially within a frustum of the visual projector.

10. The vehicle simulator system of claim 1, wherein the visual projector is configured to generate a cross-cockpit out-the-window image and the VHUD projector is configured to generate a VHUD image.

11. A vehicle simulator system comprising:
a cabin configured to receive therein a person, the cabin including at least one window; and
a visual system optics configured to project a visual image and a virtual heads up display (VHUD) image generated by a simulator that is viewable by the person through at least one VHUD eye reference frame mounted at eye level via a mounting structure to a cabin shell such that the at least one VHUD eye reference frame is movable, the at least one VHUD eye reference frame comprising a wire frame with an empty space therein to allow viewing of the projected visual image and the projected VHUD image.

12. The vehicle simulator system of claim 11, wherein the wire frame is movable between a stowed position and a deployed position.

13. The vehicle simulator system of claim 11, wherein the at least one VHUD eye reference frame is is movable between a stowed position and a deployed position.

14. The vehicle simulator system of claim 11, wherein the cabin shell is a portion of an aircraft cockpit shell.

15. The vehicle simulator system of claim 11, further comprising a visual projector configured to generate the visual image and having the visual system optics, the visual image being an out-the-window image and a VHUD projector mounted within the visual system optics of the visual projector and configured to generate a VHUD image.

16. The vehicle simulator system of claim 15, further comprising a spherical rear projection screen for projecting the out-the-window image and the VHUD image and a spherical first surface collimating mirror displaying the projected images for viewing from the cabin.

17. A method for generating simulation images for a simulator, the method comprising:
generating images using a virtual heads up display (VHUD) projector and a visual projector, wherein the VHUD projector is mounted in a visual system optics of the visual projector;
conforming a VHUD image to a visual image, by a pre-distortion correction sub-system, allowing for accurate geometric alignment of VHUD images to a visual system reference test pattern and allowing for parallax error correlation; and
displaying the images for viewing through at least one VHUD eye reference frame mounted at eye level to a cabin shell in a simulator, the at least one VHUD eye reference frame comprising a wire frame with an empty space therein to allow viewing of the displayed images.

18. The method of claim 17, wherein the VHUD projector is mounted above a frustum of the visual projector.

19. The method of claim 17, further comprising pre-distorting the images generated by the VHUD projector.

20. The method of claim 17, wherein the visual system reference test pattern includes a cross-hatch pattern.

* * * * *